United States Patent [19]

Takahashi

[11] Patent Number: 5,713,042
[45] Date of Patent: Jan. 27, 1998

[54] DOCUMENT PROCESSING APPARATUS FOR CONTROLLING CURSOR MOVEMENT AND A METHOD FOR PROCESSNG A DOCUMENT IN AN APPARATUS OPERABLE IN A PLURALITY OF EDITING MODES

[75] Inventor: Tsutomu Takahashi, Kawasaki, Japan

[73] Assignee: Canon Kabushiki Kaisha, Tokyo, Japan

[21] Appl. No.: 332,452

[22] Filed: Oct. 31, 1994

Related U.S. Application Data

[63] Continuation of Ser. No. 743,025, Aug. 9, 1991, abandoned.

[30] Foreign Application Priority Data

Aug. 14, 1990 [JP] Japan ................................ 2-214643

[51] Int. Cl.⁶ .................................................. G06F 17/21
[52] U.S. Cl. ........................ 395/802; 395/793; 345/160; 345/145
[58] Field of Search ........................ 364/419.1; 395/155, 395/161, 144–149, 792–793, 795, 798, 799, 802, 803; 400/61–69; 345/145, 157, 160, 162, 168–172

[56] References Cited

U.S. PATENT DOCUMENTS 4,808,016  2/1989  Takahashi ........................ 400/17
4,841,478  6/1989  Takahashi ........................ 364/900
4,863,298  9/1989  Takahashi ........................ 400/297

OTHER PUBLICATIONS

The Best Book of: Wordperfect Version 5.0 Author: Vincent Alfieri copyright 1988.

Acerson, Karen L. *Word Perfect Series 5 Edition The Complete Reference*, (Berkeley CA. McGraw-Hill, 1988), pp. 291–296, 768–773.

*Microsoft® Windows Write User's Guide*, 1985, pp. 23–24, 81–83.

*Primary Examiner*—Joseph H. Feild
*Attorney, Agent, or Firm*—Fitzpatrick, Cella, Harper & Scinto

[57] ABSTRACT

A document processing method of an electronic typewriter or a word processor, in which a cursor can be moved in an area of input data. A predetermined editing mode such as block shift mode or block copy mode is discriminated. The cursor movement to the outside of the input data area is permitted on the basis of the result of the discrimination. A space code, a return code, or the like is inserted at the cursor movement position.

22 Claims, 7 Drawing Sheets

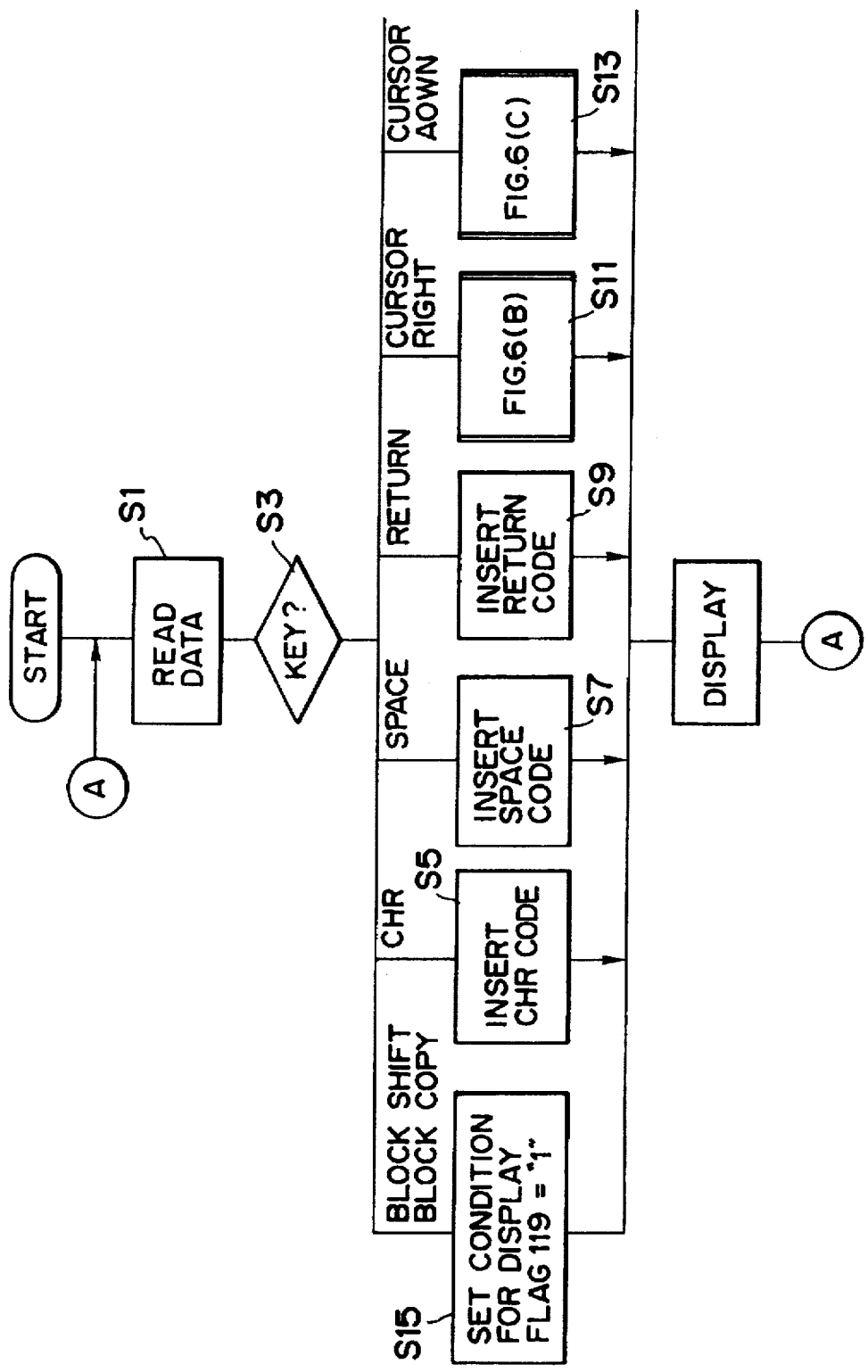

DOCUMENT PROCESSING APPARATUS FOR CONTROLLING CURSOR MOVEMENT AND A METHOD FOR PROCESSNG A DOCUMENT IN AN APPARATUS OPERABLE IN A PLURALITY OF EDITING MODES

This application is a continuation of application Ser. No. 07/743,025 filed Aug. 9, 1991, now abandoned.

BACKGROUND OF THE INVENTION

1. Field of the Invention

The invention relates to a document processing apparatus of an electronic typewriter, a word processor, or the like.

2. Related Background Art

Conventional document processing apparatus are known in which a cursor can be moved on a display only in a data portion (real data) which actually exists upon editing of a document. The cursor is not positioned with respect to a blank portion of the line end or the line head of a certain line. When movement of the cursor to the blank portion is instructed, the cursor is immediately set to the character portion of the head of the next line or the character portion of the end of the preceding line, thereby producing a high processing speed for cursor movement and improving document editing efficiency.

Document editing processes include a process (block shift) to shift an area (block) such as a desired paragraph or the like in the document to another position, a process (block copy) to copy such an area (block), and the like. Such a block designation is executed in a manner such that the operator designates the head character and the last character of the block or designates the characters in the whole block by properly using cursor movement keys.

In the above conventional example, however, the operability of such a block designation is low. This is because when the operator designates such a block, he cannot roughly designate such a block while including a portion comprising characters other than those in the block. Thus the operator cannot operate the cursor to include characters occurring beyond the end of the block and he must pay attention when the head character and the last character in the block are indicated by using the cursor without an error. It may also be required to execute the block shift process or the block copy process while including a few blank lines. For this purpose, it is necessary to designate the block after a space code, a return code, or the like which was previously inputted, or it is necessary to newly input a space or the like after completion of the block shift process or the block copy process. Thus, the execution of such an operation becomes complicated.

SUMMARY OF THE INVENTION

It is an object of the invention to solve the problems of the conventional apparatus as mentioned above and to improve the operability of document editing with respect to a document processing apparatus in which a cursor can be moved only over real data.

Another object of the invention is to provide a document processing apparatus which can move a cursor only in a data portion which has actually been inputted, wherein the apparatus Comprises: means for discriminating a predetermined editing mode; and means for allowing the cursor to be moved to outside of the data portion in the above discrimination and for inserting a space code or a return code to the movement position of the cursor.

Still another object of the invention is to provide a document processing apparatus in which the cursor movement is also permitted with respect to a portion other than data which has actually been inputted in a predetermined editing mode such as block shift mode, block copy mode, or the like, and a space code, a return code, or the like is inserted to the movement position of the cursor, so that a block designation or the like can be easily executed by merely using a cursor movement key.

BRIEF DESCRIPTION OF THE DRAWINGS

FIGS. 6A to 6C are flowcharts showing an example of a control procedure according to the apparatus of the embodiment.

DETAILED DESCRIPTION OF THE PREFERRED EMBODIMENT

An embodiment of the invention will be described in detail hereinbelow with reference to the drawings.

Figure 1A:
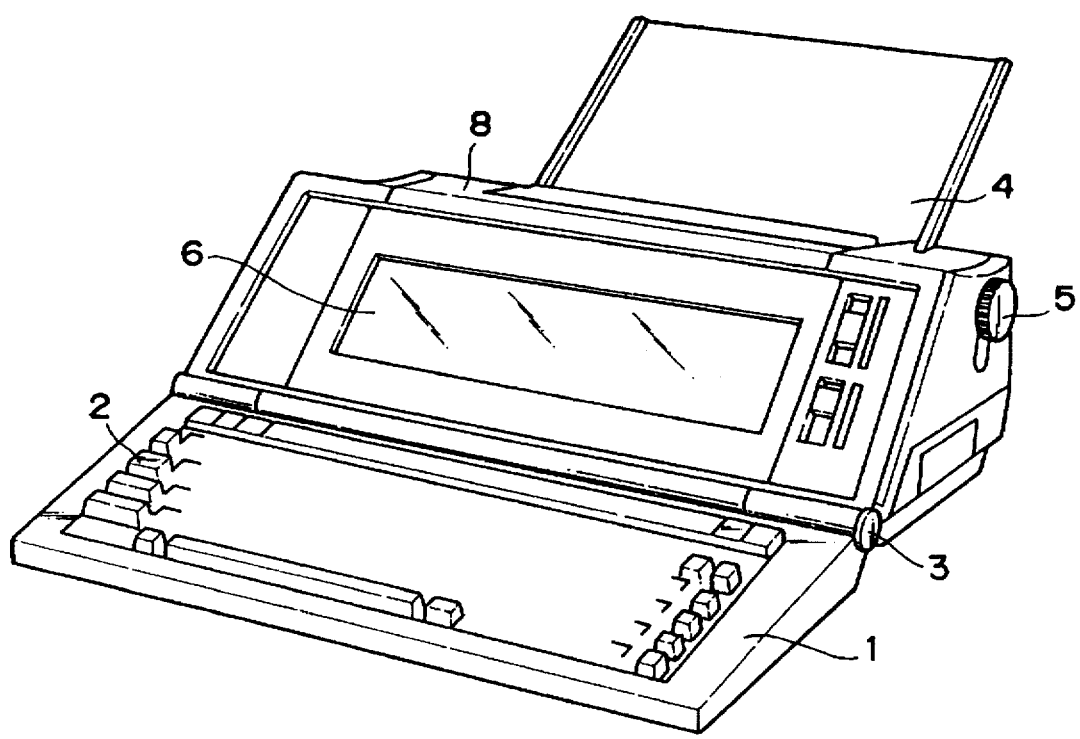
FIGS. 1A and 1B are external perspective views showing the states of an electronic typewriter as an apparatus according to an embodiment of the invention when it is used and when it is put away.
Figure 1B:
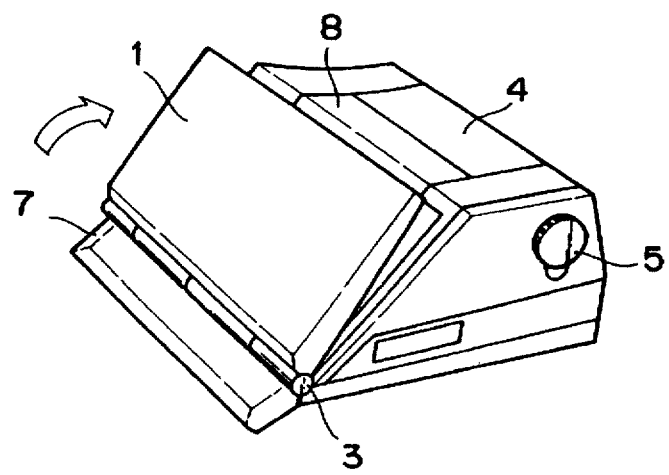

FIGS. 1A and 1B show an example of an external structure of an electronic typewriter as an apparatus to which the invention can be applied. Reference numeral 1 denotes a keyboard section in which a group of keys 2 such as keys to input characters, numerals, or the like, a control key, and the like are arranged. When the keyboard section 1 is not used, it can be folded up as shown in FIG. 1B by rotating the keyboard section 1 around a hinge 3 as a rotational center. Reference numeral 4 denotes a paper feed tray to feed a sheet-like recording medium to a printer section in the apparatus. In a manner similar to the keyboard section 1, when the paper feed tray 4 is not used, it is folded down so as to cover the printer section as shown in FIG. 1B. Reference numeral 5 denotes a feed knob to manually set or discharge the recording medium; reference numeral; 6 denotes a display to display a sentence or the like which has been inputted; and reference numeral 7 denotes a handle which is used to carry the apparatus according to the embodiment.

Figure 2:
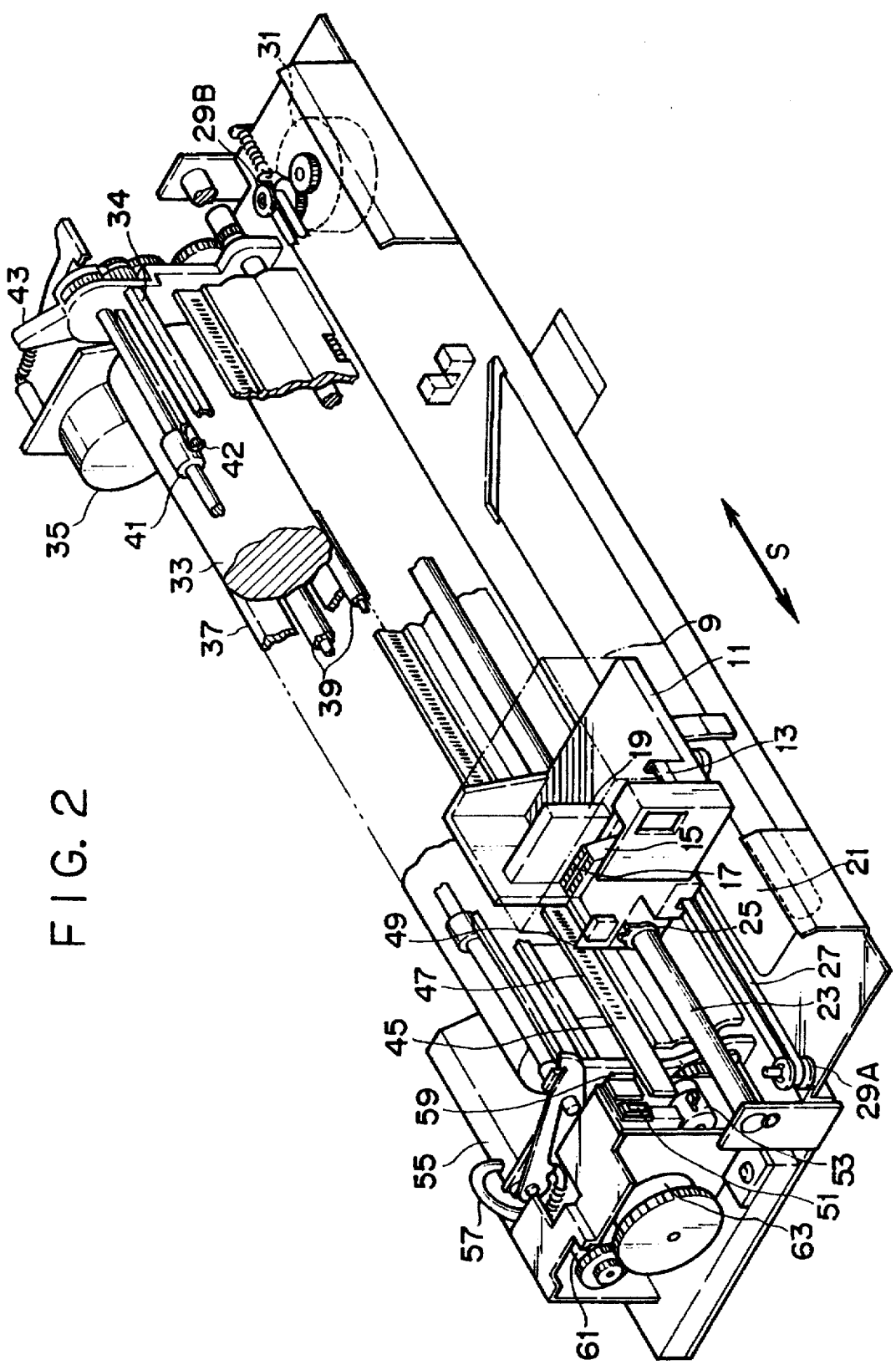
FIG. 2 is a perspective view showing an example of a structure of a printer section which can be used in the apparatus.

FIG. 2 shows an example of a structure of the printer section according to the embodiment.

Reference numeral 9 denotes a head cartridge having an ink jet recording head; reference numeral 11 denotes a carriage on which the head cartridge 9 is mounted and which scans the head cartridge in the directions indicated by arrows S in the diagram; reference numeral 13 denotes a hook to attach the head cartridge 9 to the carriage 11; and reference numeral 15 denotes a lever to operate the hook 13. The lever 15 has a marker 17 for indicating a scale formed on, for instance, a cover (not shown), thereby enabling a printing position, a setting position, or the like by a recording head of the head cartridge to be read; reference numeral 19 denotes a supporting plate to support an electrical connecting section to the head cartridge 9; and reference numeral 21 denotes a flexible cable to connect the electric connecting section and a control section of the apparatus main body.

Reference numeral 23 denotes a guide shaft to guide the carriage 11 in the S directions. The guide shaft 23 penetrates into a bearing 25 of the carriage 11. Reference numeral 27 denotes a timing belt to which the carriage 11 is fixedly attached and which transfers a motive power to move the carriage 11 in the S directions. The timing belt 27 is rove between pulleys 29A and 29B arranged in both side portions of the apparatus. A driving force is transferred to the pulley 29B by a carriage motor 31 through a transfer mechanism such as a gear and the like.

Reference numeral 33 denotes a conveying roller for restricting a recording surface of a recording medium such as a paper or the like (hereinafter, also referred to as a recording paper) and for conveying the recording medium upon recording or the like. The conveying roller 33 is driven by a conveying motor 35. Reference numeral 37 denotes a paper pan to lead the recording medium to a recording position from the side of the paper feed tray 4; reference numeral 39 denotes a feed roller which is arranged on the way of a feeding path of the recording medium and is used to press the recording medium to the conveying roller 33 and to convey the recording medium; reference numeral 34 denotes a platen which is arranged so as to face an ink emitting port forming surface of the head cartridge 9 and is used to restrict a recording surface of the recording medium; reference numeral 41 denotes a paper discharge roller which is arranged on the downstream side of the recording position in the conveying direction of the recording medium and is used to discharge the recording medium toward a paper discharge port (not shown); reference numeral 42 denotes a spur which is arranged in correspondence to the paper discharge roller 41 and is used to press the roller 41 through the recording medium and to cause a conveying force of the recording medium by the paper discharge roller 41; and reference numeral 43 denotes a release lever to cancel the pressing operations of the feed roller 39, pressing plate 45, and spur 42 upon setting or the like of the recording medium.

Reference numeral 45 denotes a pressing plate for suppressing a floating-up state or the like of the recording medium at a position near the recording position and for assuring an adhering state to the conveying roller 33. In the embodiment, an ink jet recording head which records by emitting ink is used as the recording head. Therefore, a distance between the ink emitting port forming surface of the recording head and the recording surface of the recording medium is relatively very small and such an interval must be severely managed in order to avoid contact between the recording medium and the ink emitting port forming surface. Accordingly, it is effective to arrange the pressing plate 45. Reference numeral 47 denotes a scale formed on the pressing plate 45 and 49 indicates a marker formed on the carriage 11 in correspondence to the scale 47. The printing position and the setting position of the recording head can be also read by the scale 47 and the marker 49.

Reference numeral 51 denotes a cap made of an elastic material such as rubber or the like. The cap 51 is arranged at a position so as to face the ink emitting port forming surface of the recording head at the home position and is supported so as to come into contact with and be removed away from the recording head. The cap 51 is used to protect the recording head in the non-recording mode or the like or to execute an emission recovering process of the recording head. The emission recovering process denotes a process (preemission) in which by driving an energy generating element which is arranged in the inside of each ink emitting port and is used to emit the ink, the inks are emitted from all of the emitting ports, thereby eliminating causes of defective emission such as air bubbles, dust, and ink which has become unsuitable for recording because of an increase in viscosity, and the like. The emission recovering process also denotes a process to eliminate the causes of such a defective emission by forcedly draining the ink from the emitting port independently of such a preemission.

Reference numeral 53 denotes a pump which is used for generating a sucking force to forcedly drain the ink and for sucking the ink stored in the cap 51 when the emission recovering process by the forced drain of the ink and the emission recovering process by the preemission are executed. Reference numeral 55 denotes a drain ink tank to store the drain ink which has been sucked by the pump 53. Reference numeral 57 indicates a tube to cause the pump 53 to communicate with the drain ink tank 55.

Reference numeral 59 denotes a blade to wipe the ink emitting port forming surface of the recording head. The blade 59 is supported so as to be movable between a position where the blade is projected to the recording head side and executes the wiping operation during the head movement and a backward position at which the blade does not come into engagement with the emitting port forming surface. Reference numeral 61 denotes a motor and 63 indicates a cam device which receives a motive power from the motor 61 and drives the pump 53 and moves the cap 51 and the blade 59, respectively.

Figure 3:
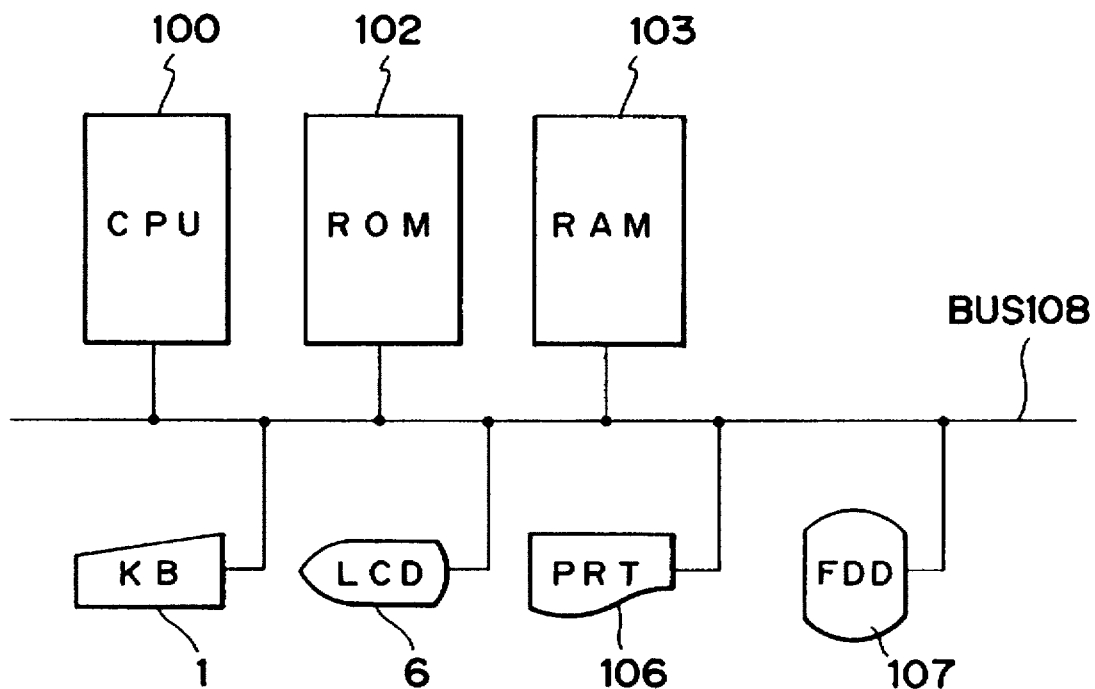
FIG. 3 is a block diagram showing an example of an electrical construction of the apparatus according to an embodiment of the invention.

FIG. 3 is a block diagram showing an outline of the document processing apparatus in an electronic typewriter form according to the embodiment. Reference numeral 100 denotes a CPU comprising a microcomputer to execute processing procedures or the like, which will be explained hereinlater, with respect to FIGS. 6A to 6C. Reference numeral 102 denotes a ROM in which programs corresponding to the processing procedures and other fixed data have been stored; reference numeral 103 denotes a RAM to temporarily store document data; reference numeral 106 denotes a printer section which has already been mentioned in conjunction with FIG. 2; reference numeral 107 denotes a floppy disk device; and reference 108 denotes a bus line to connect the above components 100 to 107 and also to connect the keyboard 1 and the display 6 shown in FIG. 1. An address bus to transfer address signals, a control bus to transfer control signals, and a data bus to transfer various kinds of data are generally referred to as a bus line.

Figure 4:
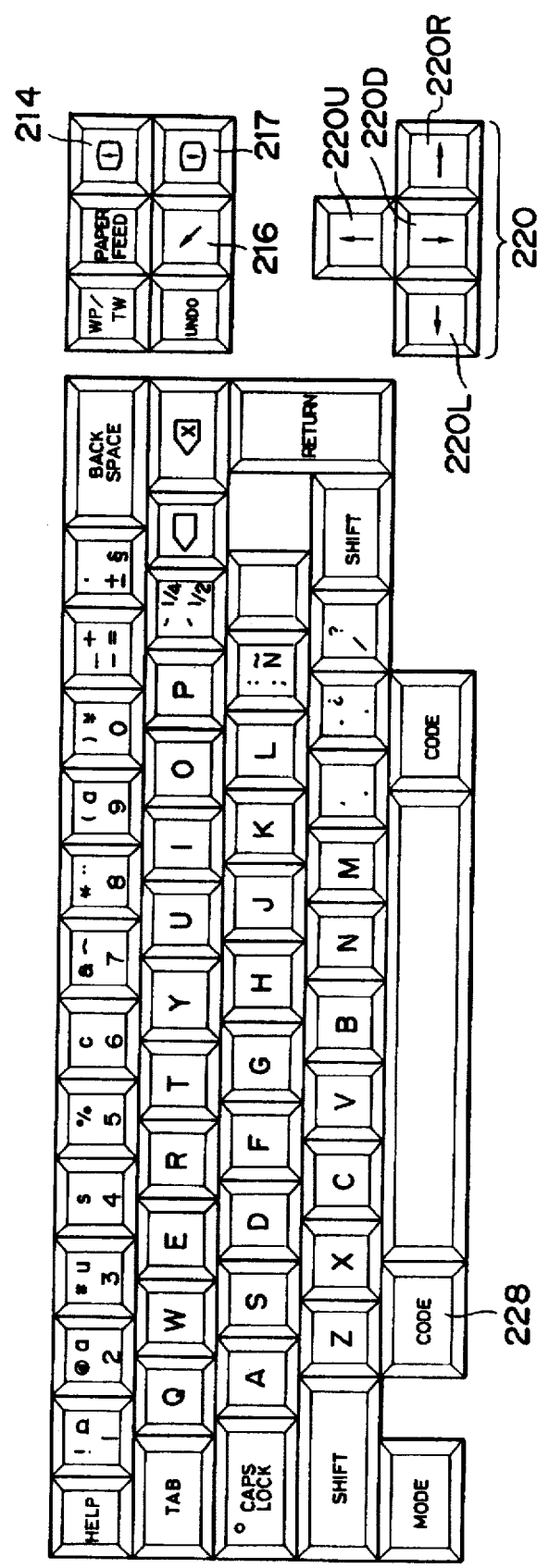
FIG. 4 is a plan view showing an example of a construction of a keyboard section.

FIG. 4 shows an example of a key arrangement on the keyboard section 1. As shown in the diagram, the keyboard section 1 according to the embodiment has a well-known arrangement including a group of input keys of characters or numerals, a space key, a back space key, a shift key, a group of other control keys, and the like. In the diagram, reference numerals 214 and 217 denote keys which are operated to display a preceding picture plane and a next picture plane; reference numeral 216 denotes a key which is used to move a cursor to the head of a document file which is being processed and to display the head portion; and reference 220 denotes (220U, 220D, 220L, 220R) a group of cursor keys to move the cursor in the directions indicated by the corresponding arrows.

Reference numeral 228 denotes a key which can execute a predetermined function by depressing another key (for instance, a numeric value key or a character key) together with the key 228. By continuously depressing either one of the keys 214, 217, and 220 together with the key 228, what is called a repeating function operates. That is, by continuously executing the simultaneous depression of the keys 228 and 214 or the keys 228 and 217, the preceding picture plane or the next picture plane is sequentially set. By continuously executing the simultaneous depression of the key 228 and the cursor key 220, the cursor is continuously moved. In the case of simultaneously depressing the keys 228 and 216, the cursor is moved to the end of a sentence. In the case of operating the cursor up movement key 220U or the cursor left movement key 220L in a state in which the cursor exists in the top line or the left end of the display screen or in the case of operating the cursor down movement key 220D or the cursor right movement key 220R in a state in which the cursor exists at the lowest line or the right end, of the display screen, the display screen is scrolled.

Figure 5:
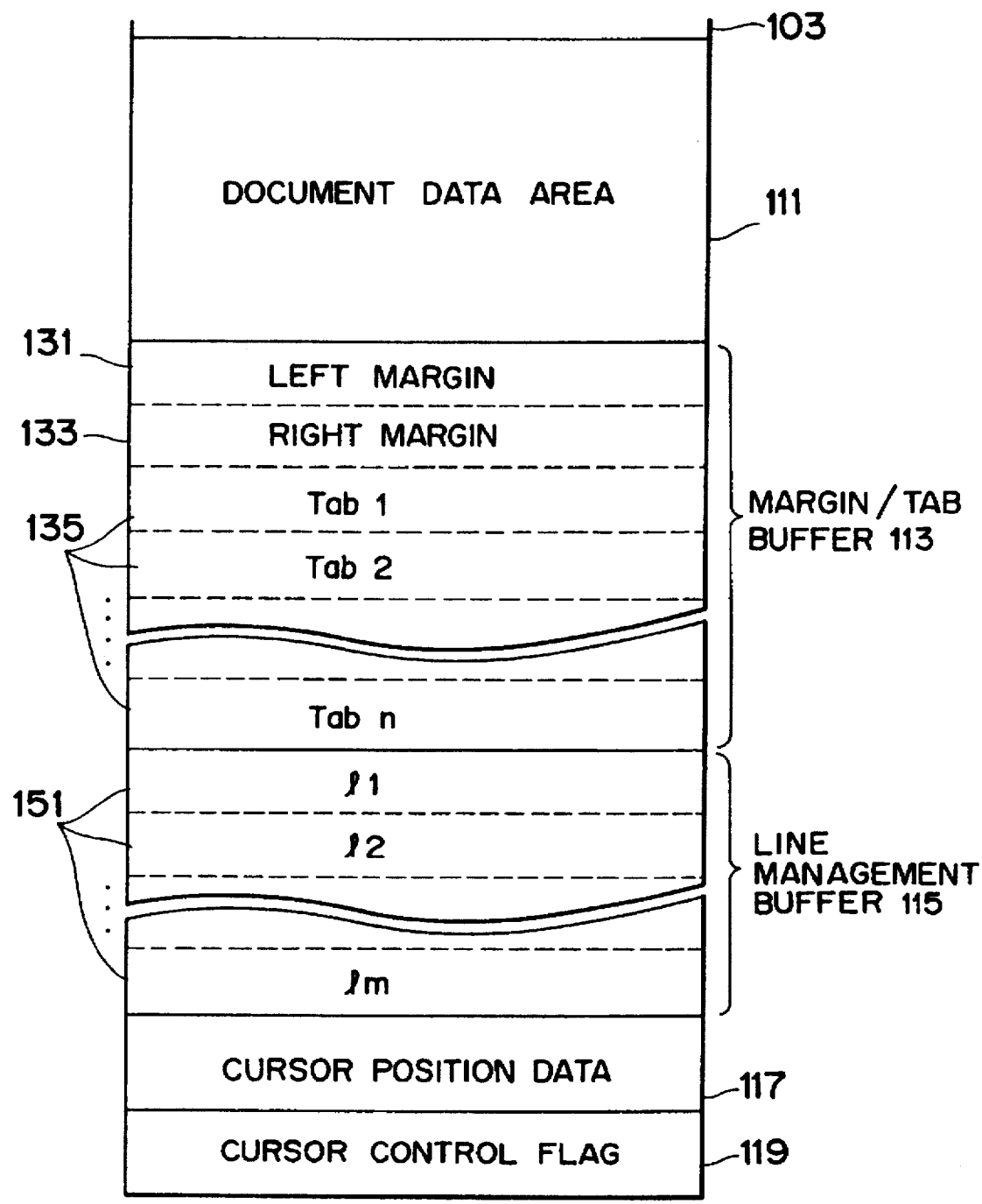
FIG. 5 is an explanatory diagram showing an example of a data arrangement in an RAM in FIG. 3.

FIG. 5 shows an example of a data arrangement in the RAM 103.

Reference numeral 111 denotes a document data area. Document data which is at present being processed such as sentence which is at present being inputted, a document which has been read out of a floppy disk, or the like is developed in the document data area 111. Reference numeral 113 denotes a margin/tab buffer comprising: a storage area 131 of left margin data which is set with respect to a document; a storage area 133 of right margin data; and storage areas 135 of tab data ($Tab_1$, $Tab_2$, . . . , $Tab_n$). Reference numeral 115 denotes a line management buffer having areas 151 to store, for instance, addresses of line head characters and other data ($l_1, l_2, \ldots, l_m$) in order to manage data which is used to display or print with respect to lines constructing a document.

Reference numeral 117 denotes a storage area to store cursor position data (cursor pointer). Reference numeral 119 indicates an area which is used as a flat to set data indicating whether the cursor is set to only the real data position upon document editing or not.

Figure 6B:
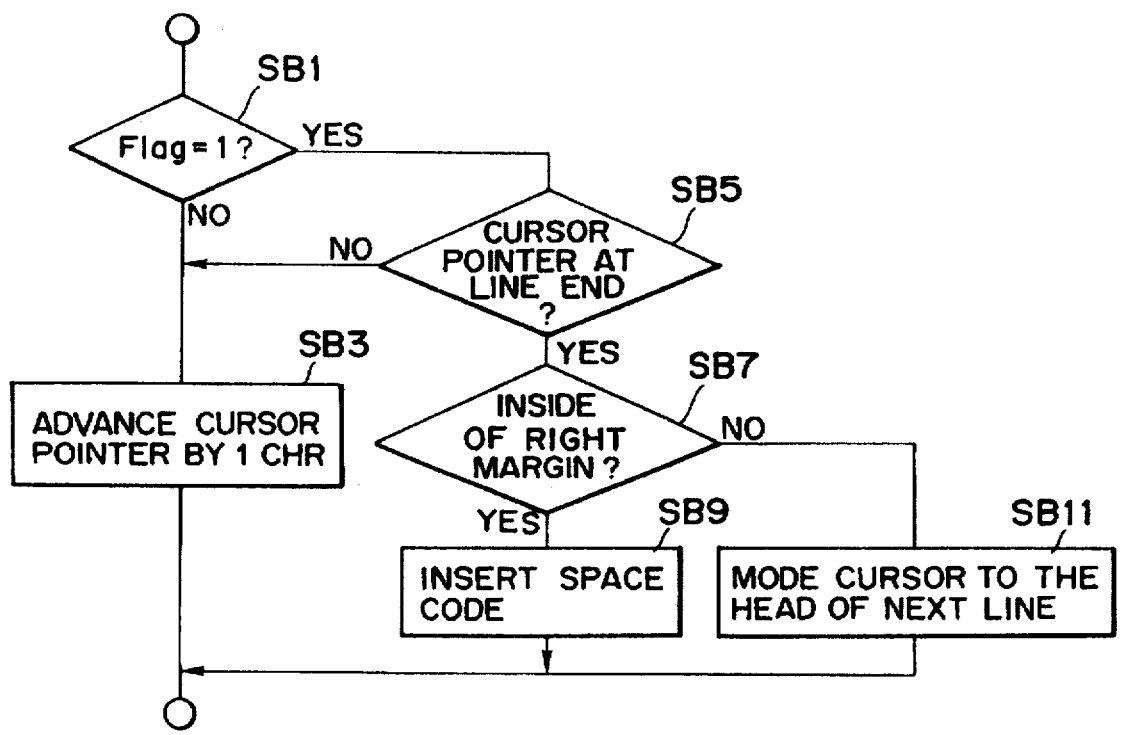
Figure 6C:
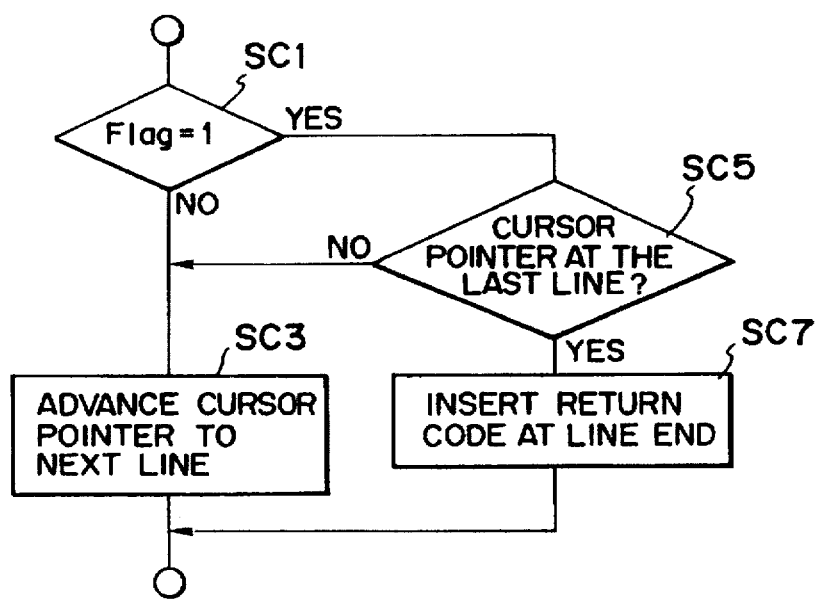

FIGS. 6A to 6C show examples of control procedures of the document processing apparatus according to the embodiment.

First, input key data is read in step S1 and the key data is discriminated in step S3. Various kinds of corresponding processes are executed in accordance with the result of the discrimination. For instance, in the case of a character key, a character code is inserted in step S5. In the case of a space key, a space code is inserted in step S7. In the case of a return key, a return code is inserted in step S9.

If a cursor key has been operated during a document editing process, the cursor is set to only the real data portion in principle. However, in the embodiment, when the cursor right movement key 220R or the cursor down movement key 220D has been operated, a process shown in FIG. 6B or 6C to enable the cursor to be also moved outside of the real data in accordance with a processing mode at that time is executed (step S11, S13). In the embodiment, a block shift mode and a block copy mode are provided as modes which permit such a cursor movement. If a key input to start the execution of those modes has been performed, the operating condition is set such that a display of a message corresponding to such a mode or the like is executed in step S15. In addition, "1" is set into the cursor control flag area 119 in FIG. 5.

In addition to the above modes, if there is a mode which permits the movement of the cursor outside of the real data, the flag can be also set to "1" in such a mode. On the contrary, in a mode in which there is no need to move the cursor to the outside of the real data or in a mode in which it is preferable that such a cursor movement is not performed, a process to reset the flag area 119 is executed in response to the input of a mode execution start key.

FIG. 6B shows an example of a processing procedure in the case where the cursor right movement key has been depressed (the repeating function can be also made operative). In step SB1, a check is first made to see if the flag has been set to "1" or not. If NO, a cursor pointer is advanced by one character in step SB3. The cursor is set to the next real data portion (the next character position in the case of the way of the line; the head character position of the next line in the case of the line end).

If YES in step SB1, that is, if the cursor right movement key 220R has been depressed in the block shift process or block copy process, a check is made in step SB5 to see if the cursor pointer indicates the character at the line end or not. If NO in step SB5, the processing routine advances to step SB3. However, if the cursor pointer indicates the character at the line end, a check is made in step SB7 to see if the cursor pointer exists on the inside of the right margin or not. If YES in step SB7, step SB9 follows and a space code is inserted to the cursor position and the cursor pointer is advanced. That is, according to the embodiment, the cursor is also moved to the outside of the real data during the block shift process or the block copy process and a space is inserted to the shift position. If the cursor has already reached the right margin position, the cursor is moved to the head of the next line in step SB11.

FIG. 6C shows an example of a processing procedure when the cursor down movement has been instructed. A check is also first made in step SC1 to see if the flag has been set to "1" or not. If NO, the cursor pointer is advanced to the next line in step SC3. On the contrary, if YES in step SC1, that is, if the cursor down movement has been instructed in the block shift process or the block copy process, a check is made in step SC5 to see if the cursor pointer indicates the last line in the document or not. If NO in step SC5, the processing routine advances to step SC3. However, if YES in step SC5, a return code is inserted to the line end of the last line in step SC7. Thus, the cursor is moved to the head position of the next line. If the cursor down movement key is further operated, a return code is sequentially inserted to the head position.

As mentioned above, according to the embodiment, when a block to be shifted or copied is designated while operating, for instance, the cursor right movement key, the block can be easily accurately designated by merely operating the cursor without executing any special operation such that attention is paid so as to accurately stop the cursor at a position of the character at the line end or a space code is previously inserted or the like. When the movement of the cursor to the outside of the read data has been instructed by operating the cursor down movement key, a return code is sequentially set for the relevant line and subsequent lines, so that the block including blank lines can be easily executed by merely operating the cursor key without performing any special operation such that a return code, a space code, or the like is preset or the like.

The invention is not limited to only the above embodiment but may modifications and variations are possible.

For instance, if a block can be designated by also moving the cursor in the backward direction, the processes as shown in FIG. 6B or 6C can be also executed with respect to the operation of the cursor left movement key 220L or the cursor up movement key 220U.

If there is a mode in which it is preferable to permit the movement of the cursor to the outside of the real data, the processes as mentioned above can be also performed for a mode other than the foregoing block shift mode or block copy mode.

Further, the apparatus to which the invention can be applied is not limited to only the electronic typewriter as mentioned above but the invention can be also applied to a Japanese word processor, other word processors, or the like. The output device is also not limited to the ink jet printer as mentioned above.

As described above, according to the invention, the cursor movement is also permitted for portions other than the data which has actually been inputted in a predetermined editing mode such as block shift mode, block copy mode, or the like, and a space code, a return code, or the like is inserted to the movement position. Therefore, the block designation or the like can be easily accurately performed by merely using the cursor movement keys. There is no need to execute any special operation or control such as to move the cursor to the outside of the real data. Thus, the operability of the apparatus can be further improved.

I claim:

1. A document editing method for editing a document in one of a plurality of editing modes, wherein in at least one of the plurality of editing modes, a cursor can be moved in response to a cursor movement instruction given by a cursor movement key, within a first area in which data has been input, said method comprising the steps of:

determining whether a specific editing mode other than the at least one of the plurality of editing modes is selected, wherein the cursor is allowed in the specific editing mode to be moved to a second area in which data has not been input; and in response to a determination in said determining step that the specific editing mode is selected and in response to an instruction, given by the cursor movement key without using other keys, for moving the cursor to a position within the second area, moving the cursor to that position and automatically inputting at least one space code in the second area.

2. A method according to claim 1, wherein said moving step inputs the space code in response to an instruction for moving the cursor rightward.

3. A method according to claim 2, wherein the specific editing mode is a block movement mode.

4. A method according to claim 2, wherein the specific editing mode is a block copy mode.

5. A method according to claim 2, wherein the second area is spaced from the first area by a return code.

6. A document editing method for editing a document in one of a plurality of editing modes, wherein in at least one of the plurality of editing modes a cursor can be moved, in response to a cursor movement instruction given by a cursor movement key, within a first area in which data has been input, said method comprising the steps of:

determining whether a specific editing mode other than the at least one of the plurality of editing modes is selected, wherein the cursor is allowed in the specific editing mode to be moved to a second area in which data has not been input; and in response to a determination in said determining step that the specific editing mode is selected and in response to an instruction, given by the cursor movement key without using other keys, for moving the cursor to a position within the second area, moving the cursor to that position and automatically inputting at least one return code in the second area.

7. A method according to claim 6, wherein said moving step inputs the return code in response to an instruction for moving the cursor downward.

8. A method according to claim 6, wherein the specific editing mode is a block movement mode.

9. A method according to claim 6, wherein the specific editing mode is a block copy mode.

10. A method according to claim 6, wherein the second area is spaced from the first area by a return code.

11. A document editing apparatus for editing a document in one of a plurality of editing modes, wherein in at least one of the plurality of editing modes a cursor can be moved, in response to a cursor movement instruction given by a cursor movement key, within a first area in which data has been input, said apparatus comprising:

instruction means for instructing movement of the cursor;

selection means for selecting one of the plurality of editing modes;

means for determining whether a specific editing mode other than the at least one of the plurality of editing modes is selected by said selection means, wherein the cursor is allowed in the specific editing mode to be moved to a second area in which data has not been input; and means for, in response to a determination by said determining means that the specific editing mode is selected and in response to an instruction, given by the cursor movement key without using other keys, for moving the cursor to a position within the second area, moving the cursor to that position and automatically inputting at least one space code in the second area.

12. An apparatus according to claim 11, wherein said instruction means instructs rightward movement of the cursor.

13. An apparatus according to claim 11, wherein the specific editing mode is a block movement mode.

14. An apparatus according to claim 11, wherein the specific editing mode is a block copy mode.

15. An apparatus according to claim 11, further comprising print means for printing the edited document.

16. An apparatus according to claim 11, wherein the second area is spaced from the first area by a return code.

17. A document editing apparatus for editing a document in one of a plurality of editing modes, wherein in at least one of the plurality of editing modes a cursor can be moved, in response to a cursor movement instruction given by a cursor movement key, within a first area in which data has been input, said apparatus comprising:

instruction means for instructing movement of the cursor;

selection means for selecting one of the plurality of editing modes;

means for determining whether a specific editing mode other than the at least one of the plurality of editing modes is selected by said selection means, wherein the cursor is allowed in the specific editing mode to be moved to a second area in which data has not been input; and means for, in response to a determination by said determining means that the specific editing mode is selected and in response to an instruction, given by the cursor movement key without using other keys, for moving the cursor to a position within the second area, moving the cursor to that position and automatically inputting at least one return code in the second area.

18. An apparatus according to claim 17, wherein said instruction means instructs downward movement of the cursor.

19. An apparatus according to claim 17, wherein the specific editing mode is a block movement mode.

20. An apparatus according to claim 17, wherein the specific editing mode is a block copy mode.

21. An apparatus according to claim 17, further comprising print means for printing the edited document.

22. An apparatus according to claim 17, wherein the second area is spaced from the first area by a return code.

* * * * *

UNITED STATES PATENT AND TRADEMARK OFFICE
CERTIFICATE OF CORRECTION

PATENT NO. : 5,713,042
DATED : January 27, 1998
INVENTOR(S) : Tsutomu Takahashi

It is certified that error appears in the above-identified patent and that said Letters Patent is hereby corrected as shown below:

COLUMN 1

Line 39, "Thus" should read --Thus,--.
    Line 41, "block" should read --block,--.
    Line 63, "Comprises:" should read --comprises:--.

COLUMN 2

Line 49, "numeral;" should read --numeral--.

COLUMN 3

Line 3, "electric" should read --electrical--.

UNITED STATES PATENT AND TRADEMARK OFFICE
CERTIFICATE OF CORRECTION

PATENT NO. : 5,713,042  Page 2 of 2
DATED : January 27, 1998
INVENTOR(S) : Tsutomu Takahashi It is certified that error appears in the above-identified patent and that said Letters Patent is hereby corrected as shown below:

COLUMN 4

Line 43, "reference" should read --reference numeral--.
Line 60, "reference" should read --reference numeral--.

COLUMN 6

Line 62, "may" should read --many--.

Signed and Sealed this

Eighteenth Day of August, 1998

Attest:

BRUCE LEHMAN

*Attesting Officer*   *Commissioner of Patents and Trademarks*